(12) United States Patent
Wang et al.

(10) Patent No.: US 11,356,423 B2
(45) Date of Patent: Jun. 7, 2022

(54) MANAGING ENCRYPTED SERVER-NAME-INDICATION (ESNI) AT PROXY DEVICES

(71) Applicant: Cisco Technology, Inc., San Jose, CA (US)

(72) Inventors: Jianxin Wang, Saratoga, CA (US); Hari Shankar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 222 days.

(21) Appl. No.: 16/742,716

(22) Filed: Jan. 14, 2020

(65) Prior Publication Data
US 2021/0218714 A1 Jul. 15, 2021

(51) Int. Cl.
*H04L 9/08* (2006.01)
*H04L 9/40* (2022.01)

(52) U.S. Cl.
CPC ........ *H04L 63/0428* (2013.01); *H04L 9/0891* (2013.01); *H04L 63/0281* (2013.01); *H04L 63/0464* (2013.01)

(58) Field of Classification Search
CPC ............... H04L 63/0428; H04L 9/0891; H04L 63/0281; H04L 63/166; H04L 63/0464
See application file for complete search history.

(56) References Cited

U.S. PATENT DOCUMENTS

| | | | | |
|---|---|---|---|---|
| 7,430,755 | B1 * | 9/2008 | Hughes | H04L 63/0823 726/3 |
| 10,291,651 | B1 * | 5/2019 | Chaubey | H04L 63/166 726/23 |
| 10,693,893 | B2 * | 6/2020 | Marzorati | H04L 63/166 |
| 10,778,780 | B2 * | 9/2020 | Jung | H04L 61/6009 |
| 2009/0193513 | A1 * | 7/2009 | Agarwal | H04L 63/166 726/15 |

(Continued)

OTHER PUBLICATIONS

Jarmoc, Jeff, and D. S. C. T. Unit. "SSL/TLS interception proxies and transitive trust." Black Hat Europe (2012). (Year: 2012).*

(Continued)

*Primary Examiner* — Jeremy S Duffield
*Assistant Examiner* — Sameera Wickramasuriya
(74) *Attorney, Agent, or Firm* — Lee & Hayes, P.C.

(57) ABSTRACT

In one embodiment, a network security device is configured to monitor data traffic between a first device and a second device. The network security device may be configured to intercept a first initial message of a first encrypted handshaking procedure for a first secure communication session between the first device and the second device, the first initial message specifying a hostname that has been encrypted using first key information associated with the network security device, decrypt at least a portion of the first initial message using the first key information to determine the hostname, re-encrypt the hostname using second key information associated with the second device, and send, to the second device, a second initial message of a second encrypted handshaking procedure for a second secure communication session between the network security device and the second device, the second initial message specifying the hostname re-encrypted using the second key information.

20 Claims, 7 Drawing Sheets

(56) References Cited

U.S. PATENT DOCUMENTS

| | | | | |
|---|---|---|---|---|
| 2011/0154019 A1* | 6/2011 | Wang | ................. | H04L 63/0471 |
| | | | | 713/153 |
| 2012/0174196 A1* | 7/2012 | Bhogavilli | ......... | H04L 63/1416 |
| | | | | 726/5 |
| 2013/0312054 A1* | 11/2013 | Wang | ................... | H04L 63/166 |
| | | | | 726/1 |
| 2014/0082204 A1* | 3/2014 | Shankar | ............... | H04L 63/166 |
| | | | | 709/227 |
| 2016/0119374 A1* | 4/2016 | Williams | ............. | H04L 63/166 |
| | | | | 713/175 |
| 2016/0134646 A1* | 5/2016 | Wing | ................... | H04L 63/166 |
| | | | | 726/23 |
| 2017/0223054 A1* | 8/2017 | Wing | ................... | H04L 63/166 |
| 2017/0289104 A1* | 10/2017 | Shankar | ............. | H04L 63/0272 |
| 2017/0339253 A1* | 11/2017 | Pathak | ................. | H04L 67/142 |
| 2017/0374017 A1* | 12/2017 | Gautam | ............. | H04L 67/2804 |
| 2019/0028439 A1* | 1/2019 | Moore | ............... | H04L 63/0272 |
| 2019/0166160 A1* | 5/2019 | Syvanne | ............ | H04L 61/6009 |

OTHER PUBLICATIONS

D. Stebila and N. Sullivan, "An Analysis of TLS Handshake Proxying," 2015 IEEE Trustcom/BigDataSE/ISPA, 2015, pp. 279-286, doi: 10.1109/Trustcom.2015.385. (Year: 2015).*

Bhargavan, Karthikeyan, et al. "Triple handshakes and cookie cutters: Breaking and fixing authentication over TLS." 2014 IEEE Symposium on Security and Privacy. IEEE, 2014. (Year: 2014).*

* cited by examiner

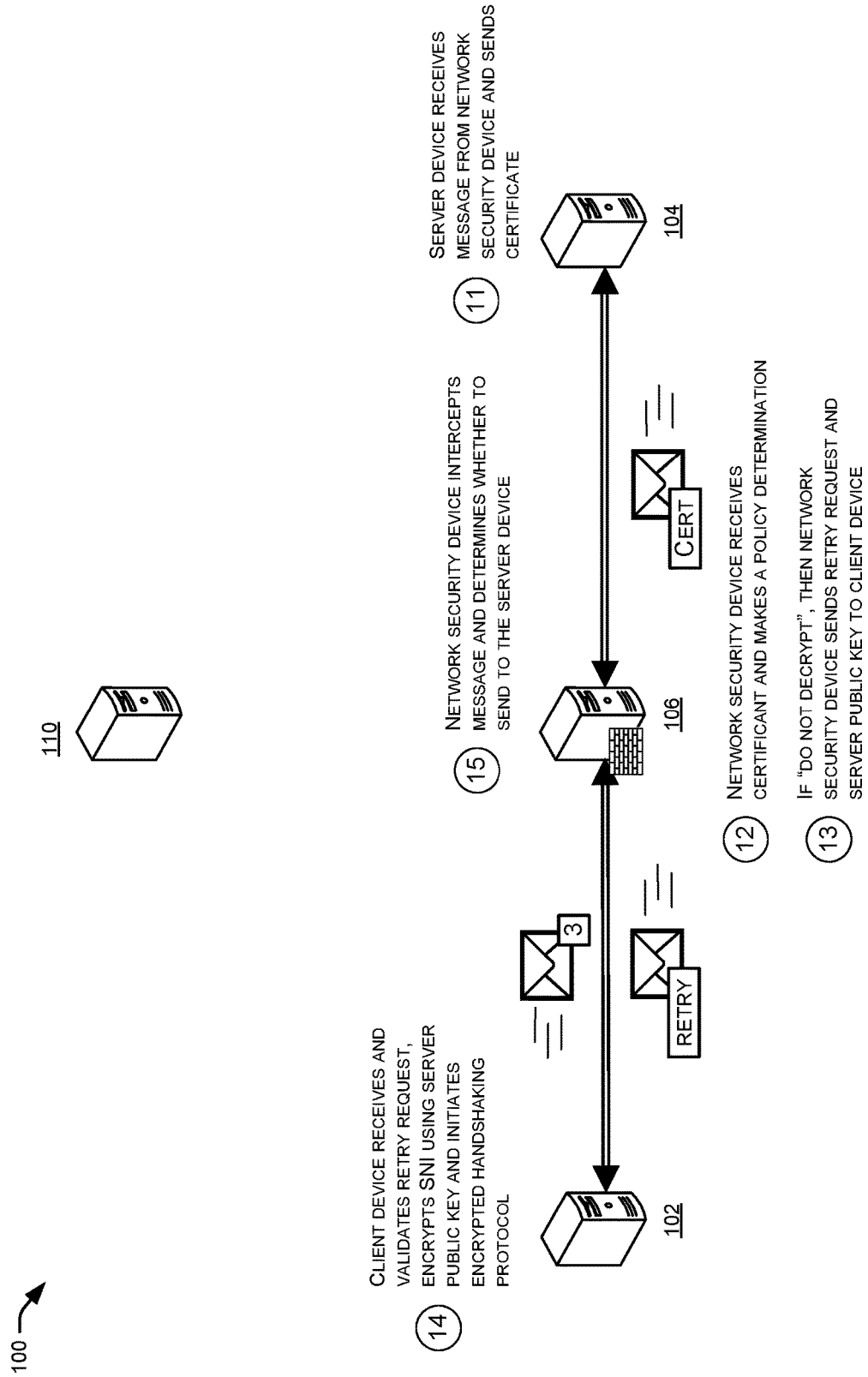

MANAGING ENCRYPTED SERVER-NAME-INDICATION (ESNI) AT PROXY DEVICES

TECHNICAL FIELD

The present disclosure relates generally to techniques for enabling a proxy device to determine whether to monitor network traffic between a client device and a server device in instances where the client device utilizes encrypted server-name-indication (ESNI).

BACKGROUND

Transport Layer Security (TLS) and other cryptographic protocols provide security for communications that client devices and server devices exchange over a network. For example, the TLS protocol creates a secure connection between a client device and a server device by symmetrically encrypting data transmitted therebetween. In addition, the TLS protocol uses public-key cryptography to authenticate the identity of the communicating parties. Finally, the TLS protocol creates a reliable connection by performing a message integrity check for each transmitted message, thus preventing loss or modification of the data during transmission.

In some instances, a network security device, or "proxy device", may reside between a client device and a server device to serve as an authorized "man-in-the-middle". In these instances, the proxy device may intercept communications between client and server devices to provide security checks on these communications. When a client device and a server device utilize the TLS protocol, the proxy device may intercept the network traffic by creating a first TLS connection between the client device and the proxy device and a second TLS connection between the server device and the proxy device. With these two secure connections in place, the proxy device may receive encrypted communications from the client device over the first TLS connection and decrypt the communications for examination. If the proxy device determines that the communications are safe and, thus, should be forwarded to the server device, the proxy device may re-encrypt the communications according to the second TLS connection and may send the re-encrypted communications to the server device over the second TLS connection. Similarly, the proxy device may perform the inverse process by receiving encrypted communications from the server device over the second TLS connection, decrypting the communications at the proxy device, determining whether the communications should be forwarded to the client device, and, if so, re-encrypting and sending the communications to the client device over the first TLS connection.

However, certain rules, such as privacy laws, may require that the proxy device refrain from decrypting certain types of communications, such as communications relating to financial transactions, health data, or the like. Thus, the proxy device may need to determine the type of communications that a client device and a server device are exchanging in order to apply an appropriate policy to these communications. That is, the proxy device may need to determine whether the client device and the server device are exchanging communications that the proxy device should not decrypt (e.g., financial- or health-related data) or whether these devices are exchanging communications that the proxy device should decrypt and inspect (e.g., non-financial and non-health-related data).

In some instances, the proxy device may make this policy determination with reference to a hostname that a client device indicates it is trying to connect to at the server device. That is, continuing the example of the TLS protocol, when the client device provides a server name indication (SNI) indicating a hostname to which the client device is attempting to connect, the proxy device may use this hostname to determine which policy to apply to subsequent data traffic between the client device and the server device. If, for example, the hostname indicates that the client device is attempting to communicate financial- or-health-related data (and if the server device provides a certificate verifying the hostname), then the proxy device may apply a policy in which the proxy device does not decrypt subsequent communications between the client device and the server device. If, however, the hostname indicates that the subsequent traffic is not related to financial- or health-related data, then the proxy device may apply a policy in which the proxy device monitors (e.g., performs security checks on) the subsequent communications between the client device and the server.

As the reader will appreciate, a proxy device may make this policy determination when the SNI provided by the client device is "in the clear". Newer versions of the TLS protocol, however, require that the client device encrypt the SNI using key information provided by the server device, resulting in the proxy device intercepting a communication that includes an encrypted SNI, or an "ESNI". Because the client device has encrypted the ESNI using key information of the server device, the proxy device is unable to decrypt and thus determine the SNI. Thus, the proxy device is unable to determine the hostname to which the client device is attempting to connect to and, thus, is unable to determine a policy to apply to subsequent communications.

In addition to the policy difficulties that ESNI introduces, because the ENSI is cryptographically bound to a "Client Hello" message, the proxy device can only pass the ENSI to the server, thus effectively rendering the proxy device entirely unusable for its intended purpose of providing network security.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A-C collectively illustrate an example scenario where a client device encrypts a hostname (e.g., specified via SNI) using key information associated with the network security device and sends a first initial message of a first handshaking procedure for a first secure communication session between the client device and the server device. The network security device, however, may intercept this first initial message, decrypt at least a portion of the first initial message to determine the hostname, re-encrypt the hostname using key information associated with the server device, and send a second initial message of a second handshaking procedure for a second secure communication session between the network security device and the server device. The network security device may thereafter determine whether to apply a policy of monitoring subsequent data traffic between the client and server devices.

DESCRIPTION OF EXAMPLE EMBODIMENTS

Overview

Figure 1:
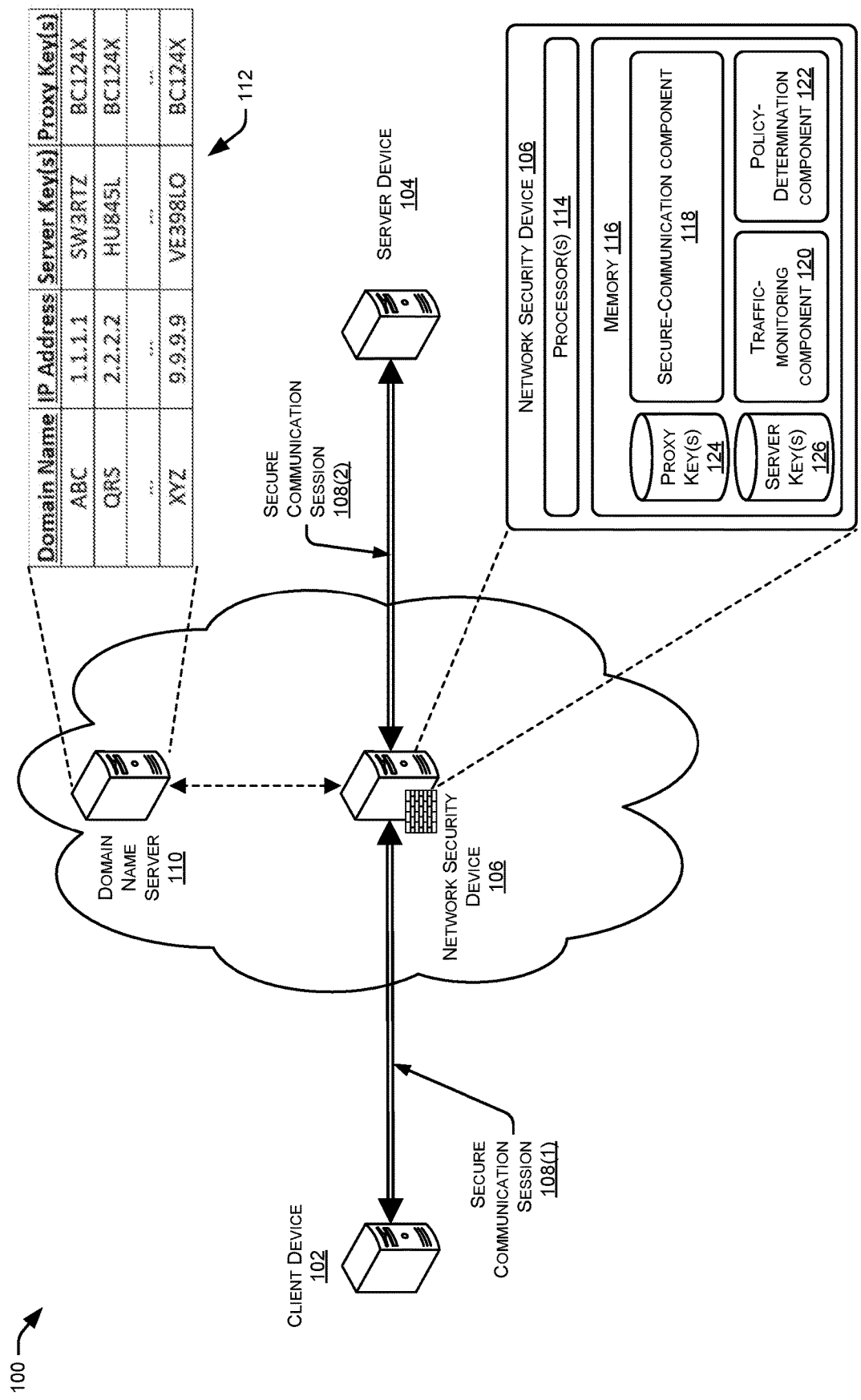
FIG. 1 illustrates an example network topology that includes a client device communicatively coupled to a network security device via a first secure communication session and a server device communicatively coupled to the network security device via a second secure communication session. In addition, the network topology includes a domain name server that stores, in association with individual domain names, key information received from server devices and key information received from the network security device.

This disclosure describes, in part, a network security device configured to monitor data traffic between a first device and a second device. The network security device may be configured to intercept a first initial message of a first encrypted handshaking procedure for a first secure communication session between the first device and the second device, the first initial message specifying a hostname that has been encrypted using first key information associated with the network security device, decrypt at least a portion of the first initial message using the first key information to determine the hostname, re-encrypt the hostname using second key information associated with the second device, and send, to the second device, a second initial message of a second encrypted handshaking procedure for a second secure communication session between the network security device and the second device, the second initial message specifying the hostname re-encrypted using the second key information.

This disclosure also describes, in part, a method implemented at least in part by a network security device configured to monitor data traffic between a first device and a second device. The method may include intercepting a first message sent from the first device and addressed to the second device, the first message specifying a hostname that has been encrypted using first key information associated with the network security device, decrypting at least a portion of the first message to determine the hostname, encrypting the hostname using second key information associated with the second device, and sending, to the second device, a second message including the hostname encrypted using the second key information.

The techniques described herein may be performed by a system and/or device having non-transitory computer-readable media storing computer-executable instructions that, when executed by one or more processors, performs methods described herein.

EXAMPLE EMBODIMENTS

This disclosure describes, in part, techniques enabling for enabling a network security device to act as a Transport Layer Security (TLS) proxy in instances where a first device initiating a TLS session utilizes encrypted server name indication (ESNI). For example, the techniques may enable the network security device to decrypt the SNI and thus determine the hostname specified by the first device. The network security device may then re-encrypt the hostname using key information associated with a second, destination device (e.g., a server device) and may initiate a TLS session with the second device. Upon receiving a certificate from the destination device, the network security device may compare information from the certificate to information from the determined hostname to ensure that the connection is safe. In addition, the network security device may determine a policy to apply to subsequent traffic between the first and second devices. If the network security device determines to apply a policy of monitoring the subsequent traffic, the network security device may maintain a first TLS connection between the first device and the proxy device and a second TLS connection between the second device and the proxy device. If, however, the network security device determines not to monitor the subsequent traffic, then the network security device may cause the first device to re-initiate a handshaking protocol to create a single TLS connection with the second device, as described in detail below.

To provide an example, a network architecture may include a network security device (e.g., a firewall device, etc.) in communication with a domain name server. In some instances, both the network security device(s) and the domain name server(s) may reside on an enterprise's premises, while in other instances these devices may additionally or alternatively reside in the cloud. In either instance, both the network security device(s) and the domain name server(s) may be under control of one or more system administrators having authority to determine network policy.

Regardless of whether the network security device resides "on-prem" or in the cloud, within the context of the network path the network security device may reside between client and server devices in order to provide security services to data traffic therebetween. The domain name server, meanwhile, may store, for each of multiple domain names, address information (e.g., IP addresses) for reaching the respective domain names. Therefore, when a client device intends to connect with a particular server device, the client device may send, to the domain name server, a request to resolve a particular domain name to a corresponding IP address. In response to receiving this request, the domain name server may use the domain name specified in the request to determine the IP address and may provide this IP address to the client device.

In addition, in instances where the client device is configured to connect to the server device via a TLS connection, the domain name server may ordinarily provide, to the client device, key information associated with the server device for enabling the client device to encrypt a desired hostname using the key information prior to sending an initial message to the server device. For example, in instances where the client device and the server device are configured to communicate via certain versions of TLS, the client device may encrypt the SNI using the key information associated with the server device. Thus, at a time prior to the request of the client device, the server device (as well as multiple other server devices) may provide their respective key information to the domain name server for sending to client devices upon the respective client devices sending resolution requests to the domain name server. For example, each server may send, to the domain name server, a public key or key information derived from the public key for use by the client devices in encrypting the SNI prior to initiating a TLS handshake with the respective server.

As described above, however, if a particular client device encrypts an SNI associated with a particular server device using key information associated with the server device, then the network security device that is configured to intercept an initial message associated with the handshaking procedure may be unable to decrypt the SNI, given that the network security device lacks the corresponding private key. Thus, as described above, the network security device may be unable to perform TLS proxy services and may be unable to determine an appropriate policy to apply to subsequent data traffic between the client device and the server device.

In order to address this problem, however, the network security device may also provide, to the domain name server, key information associated with the network security device. That is, in addition to each server device providing respective key information to the domain name server, the network security device may similarly provide its own key information (e.g., a public key or information derived therefrom) to the domain name server. In addition, the network security device may instruct the domain name server to provide the key information associated with the network security device to client devices that send resolution requests to the domain name server, with this key information being sent in lieu of the key information associated with the respective server device.

For example, envision that a user of a first device (e.g., a client device) requests to navigate to a website associated with a particular domain name that is associated with a second device (e.g., a server device). In order to navigate to this website, the client device may send the domain name and a request to resolve the domain name to the domain name server. Upon receiving this request and domain name, the domain name server may resolve the domain name into an IP address and may send this IP address to the client device. In addition, the domain name server may retrieve the key information associated with the network security device, rather than the previously received key information provided by the server device and may send this key information to the client device.

Upon receiving the IP address and the key information associated with the network security device, the client device may, according to certain versions of TLS, encrypt the desired SNI of the server device using the received key information. Stated otherwise, the client device may determine, from the request of the user, which hostname (e.g., a website) associated with the IP address the user has requested to navigate to and may encrypt this hostname within the SNI extension of the TLS protocol. However, because the client device received, from the domain name server, the key information associated with the network security device rather than the key information associated with the server device, the client device may encrypt the SNI using the key information associated with the network security device. The client device may then send an initial message to initiate a TLS handshake for creating a TLS connection with the server device.

However, the network security device, acting as an authorized "man-in-the-middle", may intercept this initial message and attempt to determine the hostname specified by the initial message. To do so, the network security device may use a key derived from its private key, corresponding a public key of the network security device used by the client device to encrypt the SNI, to decrypt the SNI and determine the hostname. Before or after determining the hostname, the network security device may then obtain the key information associated with the server device. In some instances, the network security device may use the identified hostname to request the corresponding key information from the domain name server, while in other examples the network security device may have previously obtained this key information and, thus, may obtain this information from its cache.

In either instance, the network security device may re-encrypt, using the key information associated with the server device, the hostname within the SNI and may initiate a TLS handshaking protocol with the server device. For example, the network security device may send another initial message to initiate a handshaking protocol for another TLS session between the proxy device and the server device.

Upon receiving this message, the server device may validate the message and, as part of the handshaking protocol, may send its certificate to the network security device. The network security device may receive this certificate and ensure, based on a comparison between the hostname and the certificate, that the client device and the server device should be allowed to communicate with one another. For example, the network security device may, in some instances, perform a certificate validation procedure (e.g., as defined in X.509). After the certificate passes validation, the network security device may perform a cross-check between the SNI and the certificate (e.g., using a "Common Name" and/or "Subject Alternative Name" in the certificate).

In addition, based at least in part on the determined hostname and/or information specified in the certificate, the network security device may determine a policy to apply to subsequent data traffic between the client device and the server device. For example, a system administrator may have previously set a policy indicating that the network security device is to decrypt and inspect (that is, monitor) certain types of communications between client devices and server devices, while refraining from monitoring other types of communications (e.g., financial- or health-related communications).

In instances where the network security device determines that it is to monitor subsequent communications between the client device and the server device, the network security device may finalize the handshaking protocol with the server device and may subsequently decrypt and monitor communications between the client device and the server device. That is, the network security device may maintain a first secure communication session (e.g., a first TLS session) between the client device and the network security device, as well as a second secure communication session (e.g., a second TLS session) between the network security device and the server device. Thus, upon the network security device receiving a communication from the client device via the first secure communication session, the network security device may decrypt and inspect the communication, prior to re-encrypting the communication and forwarding it along to the server device via the second secure communication session (assuming that the network security device determines it is safe to do so). Similarly, upon receiving a communication from the server device via the second secure communication session, the network security device may decrypt and inspect the communication, prior to re-encrypting the communication and forwarding it along to the client device via the first secure communication session (assuming that the network security device determines it is safe to do so).

If, however, the network security device determines that a "do not decrypt" policy applies to subsequent communications between the client and server devices, the network security device may attempt to remove itself from residing between the client and server devices in the network path. To do so, in one example the network security device may send a retry request to the client device along with the key information associated with the server device. For example, the network security device may send, to the client device, an ENSI retry request indicating that the client device should try to re-initiate a TLS connection (in this example) via an initial handshake. In addition, however, the network security device may also send the key information associated with the server device, such that the client device will encrypt the hostname in the SNI using the key information associated with the server device rather than the key information associated with the network security device.

Upon receiving this retry request, the client device may be configured to first determine if the retry request is valid. For instance, the client device may determine whether the key information that is allegedly associated with the server device is in fact associated with the server device. If not, then the client device may refrain from attempting to initiate another connection. If so, however, then the client device may use the received key information associated with the server device to encrypt the hostname in the SNI and may send another initial message for initiating yet another handshaking protocol for another secure communication session (e.g., TLS session) between the client device and the server device.

In response to the client device sending this new initial message, the network security device may again intercept the message. In this example, however, the network security device may be unable to decrypt the SNI, given that the client device encrypted the hostname in the SNI using the key information associated with the server. Thus, the network security device may be configured to determine whether it should forward the intercepted message along to the server device or refrain from doing so.

In some instances, the network security device may forward the message to the server device if the network security device receives the message within a threshold amount of time from sending the retry request to the client device (e.g., one second, five seconds, etc.) and/or if the network security device determines that the SNI from the intercepted initial message has been encrypted using the key information associated with the server (which the network security device recently provided to the client device). For example, the network security device may make this latter determination by extracting a cipher suite from the encrypted SNI of the intercepted message, calculating a local record digest of the key information associated with the server device (recently sent from the network security device to the client device) using that suite, and comparing the result with the record digest indicated by the encrypted SNI of the intercepted message. In response to determining to forward along the intercepted message to the server device, the network security device may forward the message to the server device, thus enabling the server device and the client device to complete the handshaking protocol for creating a secure communication session (e.g., a TLS connection) between the client device and the server device.

As the reader will appreciate, the techniques described herein thus enable a network security device to act as an authorized "man-in-the-middle" within the context of encrypted SNI, helping satisfy both enterprise security requirements and privacy-over-the-Internet concerns. These techniques may, in some instances, enable the network security device to act as a TLS proxy device without requiring removal of encrypted SNI from the handshaking protocol and without requiring client-side retries. Further, the techniques enable the network security device to determine a specified SNI "in the clear", while ensuring that the SNI remains encrypted on both sides of the network security device. Further, the SNI remains encrypted using the key information associated with the server device towards the server device, thus maintaining a high degree of privacy over the Internet. In addition, the techniques enable the network security device to selectively act as a TLS proxy, or not, based on policy requirements, such as privacy laws or the like.

Certain implementations and embodiments of the disclosure will now be described more fully below with reference to the accompanying figures, in which various aspects are shown. However, the various aspects may be implemented in many different forms and should not be construed as limited to the implementations set forth herein. For instance, it is to be appreciated that while examples are described herein with reference to TLS handshakes and TLS connections, the techniques may apply to other encrypted handshaking protocols and other secure communication sessions. The disclosure encompasses variations of the embodiments, as described herein. Like numbers refer to like elements throughout.

FIG. 1 illustrates an example network topology 100 that includes a client device 102, a server device 104, and a network security device 106 therebetween. As illustrated, the client device 102 may communicatively couple to the network security device 106 via a first secure communication session 108(1) (e.g., a first TLS session), while the server device 104 may communicatively couple to the network security device 106 via a second secure communication session 108(2) (e.g., a second TLS session). In addition, the network topology 100 includes a domain name server 110 that stores, in association with individual domain names, data 112 indicating key information received from server devices and key information received from the network security device.

As introduced above, the network topology 100 may enable the network security device 106 to act as a TLS proxy even within the context of encrypted SNI. To begin, the server device 104, as well as multiple other server devices, may send respective key information to the domain name server 110, which may store this key information in association with a specified domain name of the server device 104. For example, envision that the server device is associated with a domain name of "ABC" and an IP address of "1.1.1.1". Envision further that the server device 104 provides, to the domain name server 110, a public key associated with the server device (represented as "SW3RTZ" for ease of illustration). In response to receiving this public key, the domain name server 110 may store this information within the data 112 in association with the domain name of the server device ("ABC") and the IP address of the server device ("1.1.1.1"). Further, and as illustrated, the domain name server may maintain an association between domain names, IP addresses, and server key information for each of multiple other server devices (not illustrated in FIG. 1).

In addition, the network security device 106 may provide its key information, such as a public key, to the domain name server 110. Upon receiving this key information (denoted as "Proxy Key(s)" in FIG. 1), the domain name server may store this information as part of the data 112. As illustrated, for example, the domain name server may store this proxy key information (represented as "BC124X" for ease of illustration) in association with each domain name/IP address combination.

Sometime after the server device 104 and the network security device 106 have provided their respective key information to the domain name server, the client device 102 may send a request to resolution request to the domain name server 110. For instance, a user of the client device 102 may request to navigate to a website associated with host1.ABC.com. In response to receiving this request, the domain name server 110 may be configured to resolve the domain name ("ABC") into an IP address. For example, the domain name server 110 may determine the domain name specified by the request ("ABC") and may identify, from the data 112, an IP address associated with the specified domain ("1.1.1.1" in this example). In addition, however, the domain name server 110 may be configured to send the proxy key information back to the client device 102 along with the IP address. Thus, in this example, the domain name server 110 may send an indication of the IP address, 1.1.1.1, along with an indication of the public key of the network security device, represented in this example as BC124X.

In response to receiving this information, the client device 102 may encrypt the hostname (in this example, "host1") in the SNI extension and may generate a first initial message for initiating a handshaking protocol for creating a secure communication session with the server device 104. The network security device 106, however, may intercept this first initial message to perform security services on behalf of the client device 102.

As illustrated, the network security device 106 comprises one or more processors 114 and memory 116. The memory 116 may store a secure-communication component 118, a traffic-monitoring component 120, and a policy-determination component 122. In addition, the memory 116 may include a datastore 124 storing key information associated with the network security device 106 (e.g., "proxy key(s)"), as well as a datastore 126 storing key information association with server devices, such as the server device 104 (e.g., "server key(s)").

In general, the secure-communication component 118 may function to establish secure communication sessions between the network security device 106 and one or more other devices. For example, the secure-communication component 118 may function to establish the first secure communication session 108(1) with the client device 102 and the second secure communication session 108(2) with the server device 104. In some instances, the secure-communication component 118 is configured to engage in an encrypted handshaking protocol with a respective device for establishing a secure communication session. For example, the secure-communication component 118 may engage in a TLS handshaking protocol for establishing a TLS connection with a device.

The traffic-monitoring component 120, meanwhile, may function to decrypt and inspect data traffic between devices, such as traffic sent to and/or from the client device 102 and/or the server device. In some instances, the traffic-monitoring component 120 determines whether or not to monitor the traffic with reference to a policy determined by the policy-determination component 122. For example, the policy-determination component 122 may determine, for a particular secure communication session, whether the traffic-monitoring component 120 is to decrypt and inspect the traffic. In some instances, the policy-determination component 122 may implement a policy where sensitive traffic (e.g., financial- or health-related data) is not decrypted and inspected, while remaining traffic is. As noted above, the policy-determination component 122 may make this determination with reference to a hostname, data indicated in a certificate provided by a server device, and/or the like.

In some instances, in response to intercepting the initial message sent from the client device 102, the secure-communication component 118 may first attempt to decrypt the encrypted SNI using key information stored in the datastore 124. That is, because the intercepted message includes the hostname as encrypted using key information derived from a public key associated with the network security device 106, the secure-communication component 118 may decrypt the encrypted SNI using key information derived from a private key associated with the network security device. Upon decrypting the ESNI to determine the hostname, the secure-communication component 118 may obtain the server keys associated with the server device 104 that is associated with the specified domain and hostname. In some instances, the secure-communication component 118 may request and receive this server key information from the domain name server 110, while in other instances the network security device 106 may have previously stored this key information and, thus, the secure-communication component 118 may retrieve this key information from the datastore 126.

In either instance, the secure-communication component 118 may re-encrypt the hostname using the key information associated with the server device and may generate a second initial message (including the hostname as encrypted using the server public key or information derived therefrom). The secure-communication component 118 may then send this second initial message to the server device 104 for initiating a handshaking protocol for creating the secure communication session 108(2) between the network security device 106 and the server device 104.

In response to receive this second initial message (the first message received by the server device 104), the server device may provide a certificate to the secure-communication component 118. Upon receiving the certificate, the secure-communication component 118 may compare information from the certificate to the determined hostname to ensure that the proposed connection between the client device 102 and the server device 104 is safe.

In addition, the policy-determination component 122 may determine, based at least in part on the determined hostname and/or the certificate, a policy to apply to subsequent data traffic between the client device 102 and the server device 104. If the policy-determination component 122 determines that the traffic-monitoring component 120 is to monitor (e.g., decrypt and inspect) the subsequent traffic, then the secure-communication component 118 may continue to act as an authorized man-in-the-middle between the client device 102 and the server device 104. For instance, secure-communication component 118 will continue to communicate with the client device via the first secure communication session 108(1) (e.g., the first TLS connection) and with the server device 104 via the second secure communication session 108(2) (e.g., the second TLS connection).

If, however, the policy-determination component 122 determines that the policy to apply to the subsequent traffic is "do not decrypt", then the secure-communication component 118 may cause client device to establish a secure communication session directly with the server device 104. For example, the secure-communication component 118 may send, to the client device 102, the key information associated with the server device 104 along with a retry request indicating that the client device 102 is to again send an initial message for initiating a handshaking protocol.

In response to receiving the retry request and the server key information, the client device 102 may first determine whether the retry request is valid. For example, the client device 102 may verify that the key information received from the network security device 106 does in fact correspond to the server device 104. If so, then the client device 102 may generate third initial message for initiating an encrypted handshaking protocol for a secure communication session between the client device 102 and the server device 104. Again, the third initial message may specify the desired hostname (e.g., "host1"), although this hostname may be encrypted using the key information associated with the server device 104 rather than the key information associated with the network security device 106 (as was done in the first initial message).

The network security device 106 may intercept this third initial message and may determine whether to forward this third initial message to the server device. For instance, the network security device 106 may forward the message to the server device 104 if the network security device 106 receives this message within a threshold amount of time from sending the retry request to the client device 102 and/or if the network security device 106 determines that the SNI from the intercepted initial message has been encrypted using the key information associated with the server device 104 (which the network security device recently provided to the client device). For example, the network security device 106 may make this latter determination by extracting a cipher suite from the encrypted SNI of the intercepted message, calculating a local record digest of the key information associated with the server device 104 using that suite, and comparing the result with the record digest indicated by the encrypted SNI of the intercepted message. In response to determining to forward along the intercepted message to the server device 104, the network security device 106 may forward the message to the server device 104, thus enabling the server device 104 and the client device 102 to complete the handshaking protocol for creating a secure communication session (e.g., a TLS connection) between the client device 102 and the server device 104. Thus, the network security device 106 will no longer act as a man-in-the-middle, thus ensuring that the "do not decrypt" policy determined by the policy-determination component 122 is executed by the network security device 106.

Figure 2A:
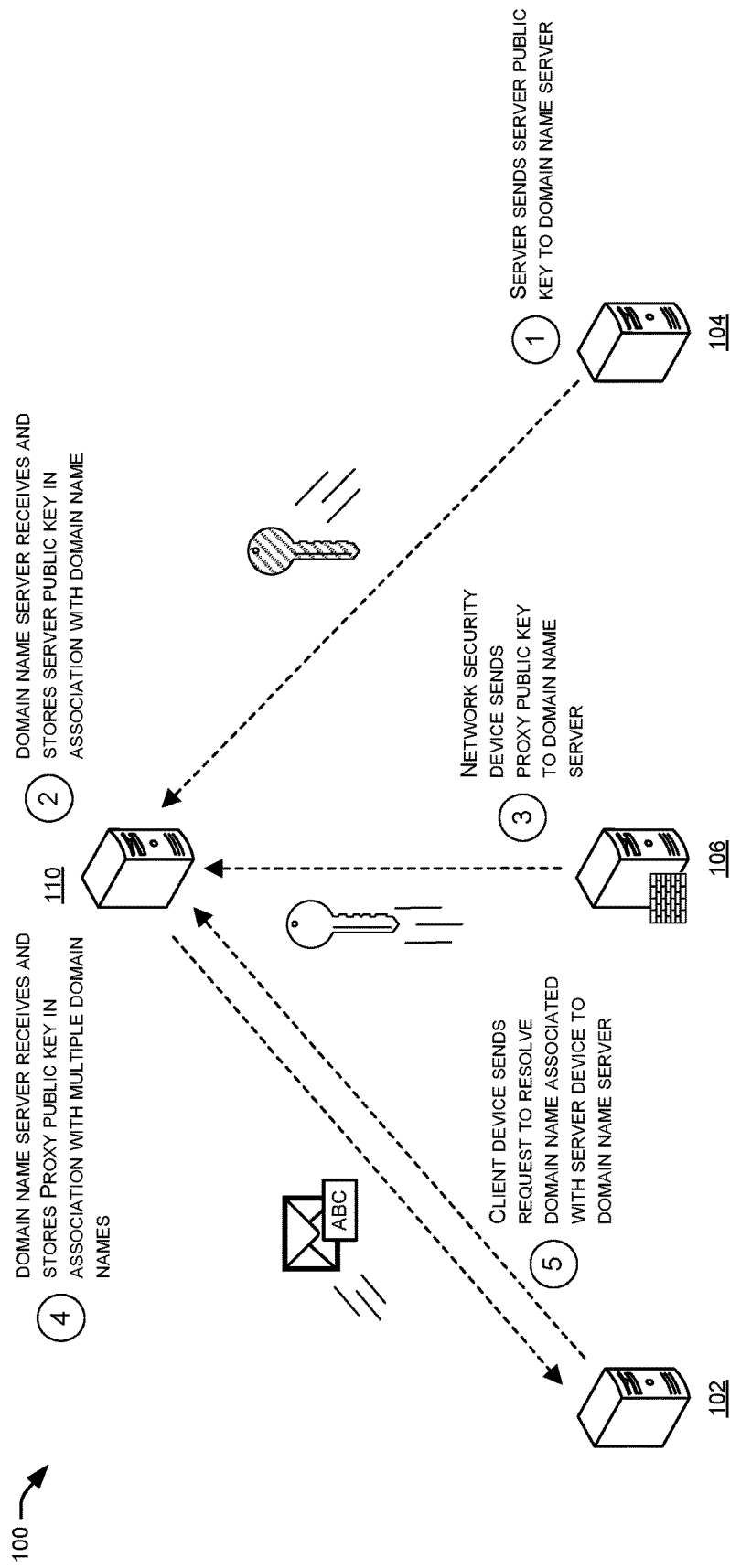
Figure 2B:
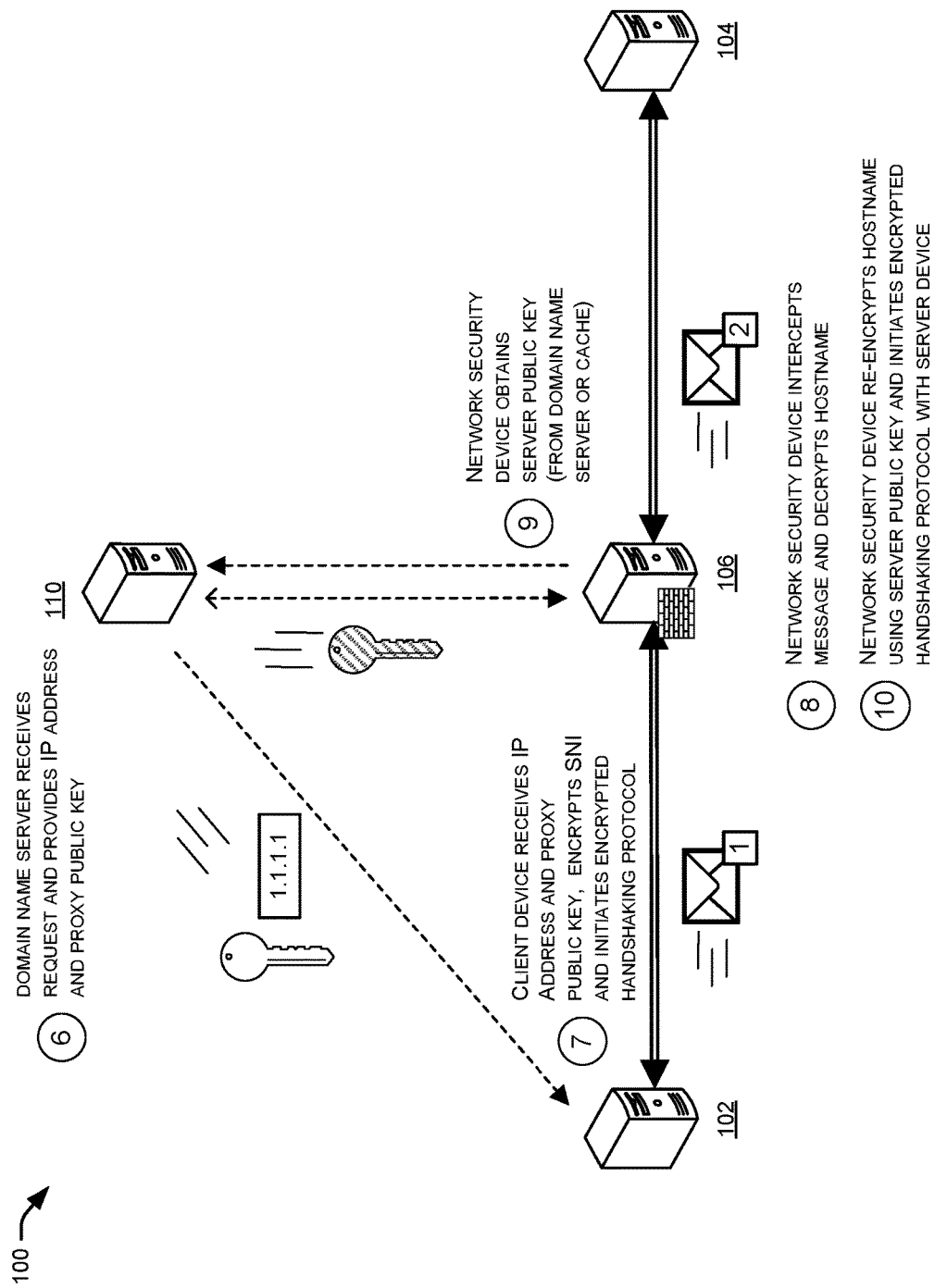

FIGS. 2A-C collectively illustrate an example scenario 200 where the client device 102 of FIG. 1 encrypts a hostname (e.g., specified via SNI) using key information associated with the network security device 106 and sends a first initial message of a first handshaking procedure for a first secure communication session between the client device 102 and the server device 104. The network security device 106, however, may intercept this first initial message, decrypt at least a portion of the first initial message to determine the hostname, re-encrypt the hostname using key information associated with the server device 104, and send a second initial message of a second handshaking procedure for a second secure communication session between the network security device 106 and the server device 104. The network security device 106 may thereafter determine whether to apply a policy of monitoring subsequent data traffic between the client and server devices.

At "1", the server device 104 sends a public key of the server to the domain name server 104. At "2", and in response, the domain name server receives the public key associated with the server device and stores this public key in association with the domain name, as illustrated and discussed above with reference to the data 112 of FIG. 1. At "3", meanwhile, the network security device 106 sends a public key of the network security device 106 (or "proxy public key") to the domain name server. The domain name server 110 receives the proxy public key at "4" and stores the proxy public key in association with each of multiple domain names, including the domain name associated with the server device 104. At "5", a client device 102 sends a request to resolve a domain name associated with the server device to the domain name server.

FIG. 2B continues the illustration of the example scenario 200 and includes, at "6", the domain name server 110 receiving the request from the client device 102 and mapping the specified domain name to an IP address associated with the server device. The domain name server 110 then sends this IP address along with the proxy public key back to the client device 102. As the reader will appreciate, the client device thus has the proxy public key, but not the server public key, at this point.

At "7", the client device 102 receives the IP address of the server device 104 along with the proxy public key and proceeds to encrypt the hostname in the SNI using key information derived from the proxy public key. In addition, the client device initiates a first encrypted handshaking protocol for a secure communication between the client device and the server device 104 by sending a first initial message towards the server device, with this first initial message including the SNI encrypted using the proxy public key. At "8", the network security device 106 intercepts this first initial message and, using key information derived from a private key corresponding to the proxy public key, decrypts the encrypted SNI to determine the hostname. The network security device 106 stores an indication of this determined hostname.

At "9", the network security device 106 obtains the server public key associated with the server device 104, which the network security identified from the first initial message. As noted above, the network security device 106 may obtain the server public key by requesting this key from the domain name server 110, or the network security device 106 may obtain this key from its own local storage in instances where the network security device 106 has previously obtained the server public key from the domain name server 110.

At "10", the network security device 106 re-encrypts hostname in the SNI using keys derived from the server public key and the device's contribution "key share", and generates a second initial message (including the SNI encrypted by the network security device) for initiating a second encrypted handshaking protocol for a second secure communication session between the network security device 106 and the server device 104.

FIG. 2C continues the illustration of the example scenario 200 and includes, at "11", the server device 104 receiving the second initial message from the network security device 106 and sending a certificate of the server device 104 to the network security device 106 in response. At "12", the network security device 106 receives the certificate and makes a policy determination regarding whether to decrypt and inspect subsequent network traffic sent between the client device 102 and the server device 102. If the network security device 106 determines to decrypt and inspect the subsequent traffic, then the process may end and the network security device 106 may continue to operate as an authorized man-in-the-middle. To do so, the network security device 106 may continue to communicate with the client device 102 via the first secure communication channel 108(1) and with the server device via the second secure communication channel 108(2).

In this example scenario, however, the network security device 106 determines, at "13" that the network security device 106 is to implement a "do not decrypt" policy. Thus, the network security device 106 sends a retry request along with the server public key back to the client device 102. The client device 102 receives the retry request and the server public key at "14", validates the request, and encrypts the hostname in the SNI using the server public. In addition, the client device generates and send a third initial message (including the SNI encrypted using the server public key) to initiate a third encrypted handshaking protocol for a secure communication session between the client device 102 and the server device 104.

At "15", the network security device 106 intercepts the third initial message and determines whether to forward the third initial message to the server device 104. In some instances, the network security device 106 may forward the message to the server device 104 if the network security device 106 receives the third initial message within a threshold amount of time from sending the retry request to the client device 102 and/or if the network security device 106 determines that the SNI from the third initial message has been encrypted using the server public key. For example, the network security device 106 may make this determination by extracting a cipher suite from the encrypted SNI of the third initial message, calculating a local record digest of the server public key using that suite, and comparing the result with the record digest indicated by the encrypted SNI of the third initial message. In response to determining to forward along the third initial message to the server device 104, the network security device 106 may forward the message to the server device 104, thus enabling the server device 104 and the client device 102 to complete the third encrypted handshaking protocol for creating the third secure communication session (e.g., a TLS connection) between the client device 102 and the server device 104.

Figure 3A:
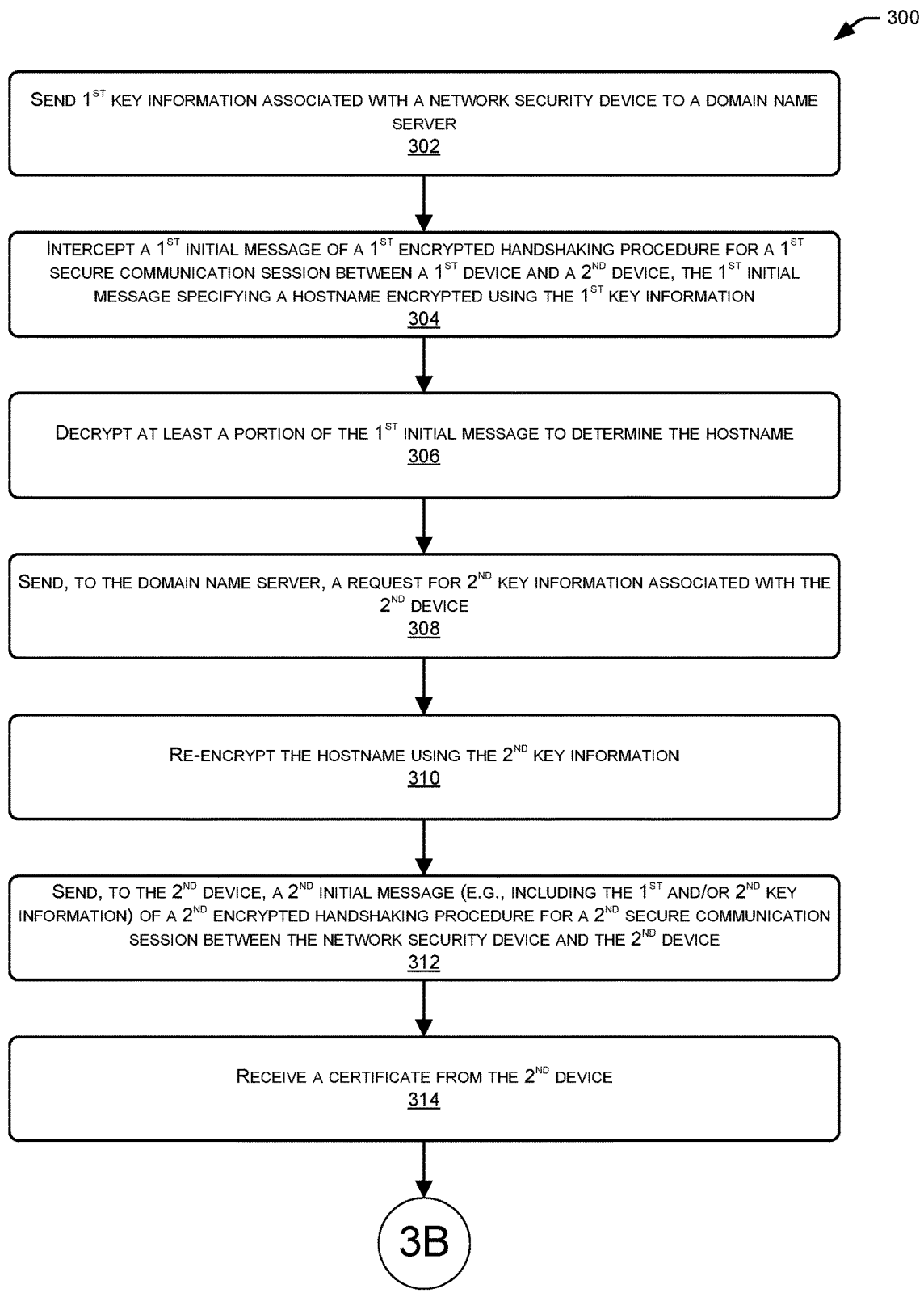
FIGS. 3A-B collectively illustrate an example process that a network security device may implement in order to provide TLS-proxy services in instances where a client device initiates a handshaking protocol using ESNI.
Figure 3B:
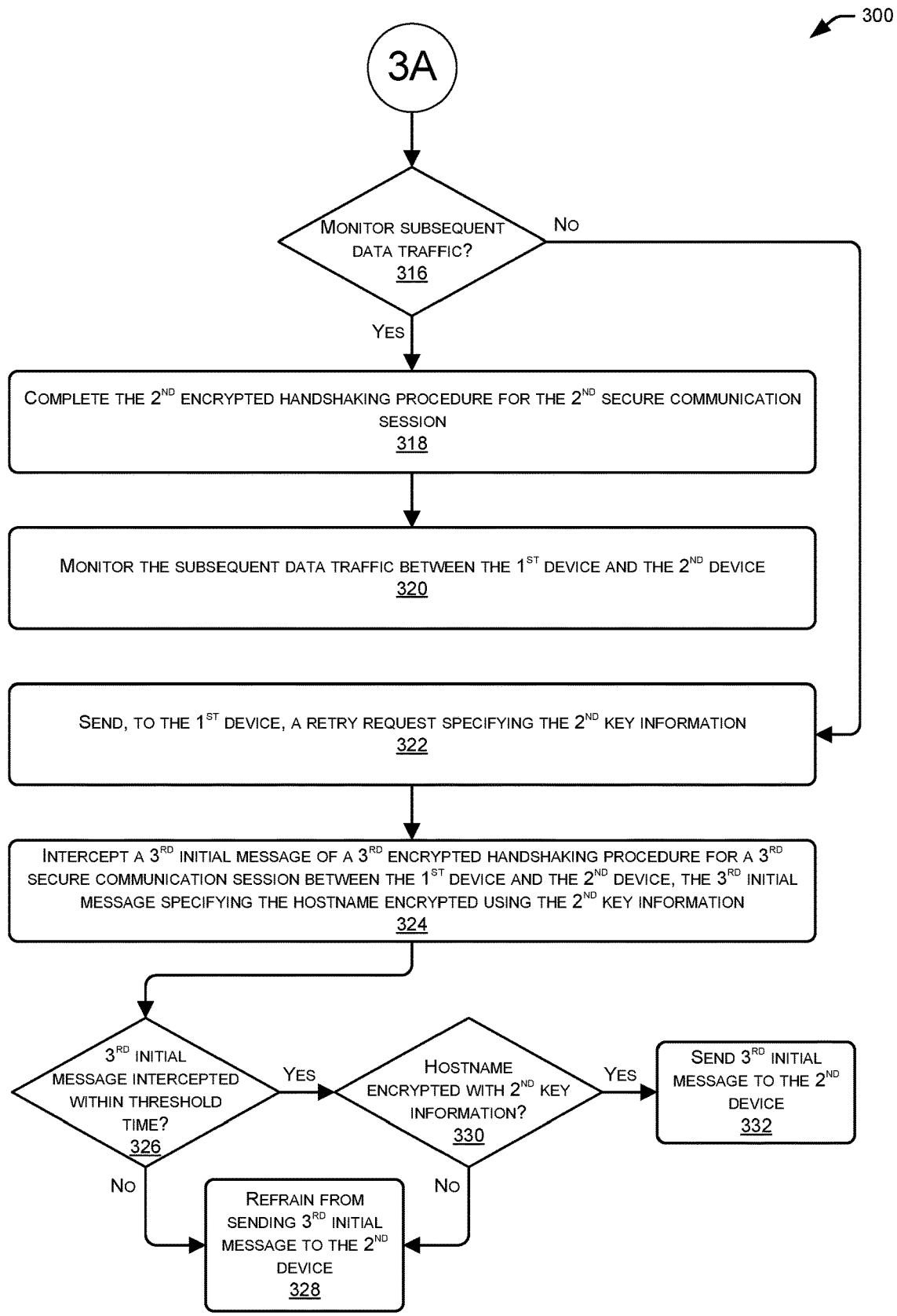

FIGS. 3A-B collectively illustrate an example process 300 that a network security device may implement in order to provide TLS-proxy services in instances where a client device initiates a handshaking protocol using ESNI. This process, and other processes and scenarios described herein, may be implemented (1) as a sequence of computer-implemented acts or program modules running on a computing system and/or (2) as interconnected machine logic circuits or circuit modules within the computing system. Further, while the processes and scenarios are described as being performed by an example network security device (or "proxy device"), it is to be appreciated that one or more other computing devices may additionally or alternatively perform some or all of these operations.

At an operation 302, an example network security device may send first key information associated with the network security device to a domain name server, which may store the first key information. At an operation 304, the network security device may intercept a first initial message of a first encrypted handshaking procedure for a first secure communication session between a first device and a second device. In some instances, the first device may comprise a client device, while the second device may comprise a server device. Further, the first initial message may specify a hostname that has been encrypted using the first key information discussed above with reference to the operation 302.

At an operation 306, the network security device may decrypt at least a portion of the first initial message using the first key information to determine the hostname. For example, if the first key information represents (e.g., is derived from) a public/private key pair of the network security device, and if the first initial message was encrypted using the public key of the network security device, then at the operation 306 the network security device may decrypt the hostname in the SNI extension using the private key of the network security device.

At an operation 308, the network security device may send, to the domain name server, a request for second key information associated with the second device. The network security device may receive the second key information from the domain name server in response. At an operation 310, the network security device may re-encrypt the hostname using the second key information and, at an operation 312, may send, to the second device, a second initial message of a second encrypted handshaking procedure for a second secure communication session between the network security device and the second device. In some instances, the second initial message may specify the hostname re-encrypted using the second key information. Further, the second initial message may include the second key information for encrypting the second encrypted handshaking procedure. At an operation 314, the network security device may receive a certificate from the second device in response.

FIG. 3B continues the illustration of the process 300 and includes, at an operation 316, determine whether to minute subsequent data traffic between the first and second devices. If the network security device determines to monitor the subsequent data traffic, then at an operation 318 the network security device completes the second encrypted handshaking protocol for the second secure communication session and, at an operation 320, monitors the subsequent data traffic between the first device and the second device. This may include decrypting each message sent between these devices, inspecting the message contents, and determining whether to re-encrypt and forward along the respective message or disregard the respective message.

If, however, the network security device determines to refrain from monitoring the subsequent data traffic, then at an operation 322 the network security device sends, a retry request specifying the second key information. At an operation 324, the network security device intercepts a third initial message of a third encrypted handshaking procedure for a third secure communication session between the first device and the second device. In some instances, the third initial message may specify the hostname that has been encrypted using the second key information.

At an operation 326, the network security device determines whether the third initial message was intercepted within a threshold amount of time from the sending of the retry request. If not, then at an operation 328 the network security device may refrain from sending the third initial message to the second device. If, however, the network security device determines that the third initial message was received within the threshold amount of time from the sending of the retry request, then at an operation 330 the network security device may determine whether the hostname was encrypted, in the third initial message, with the second key information. If not, then the network security device may refrain from sending the third initial message to the second device. If so, however, then the network security device may send the third initial message to the second device.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2A-B and 3A-B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 4:
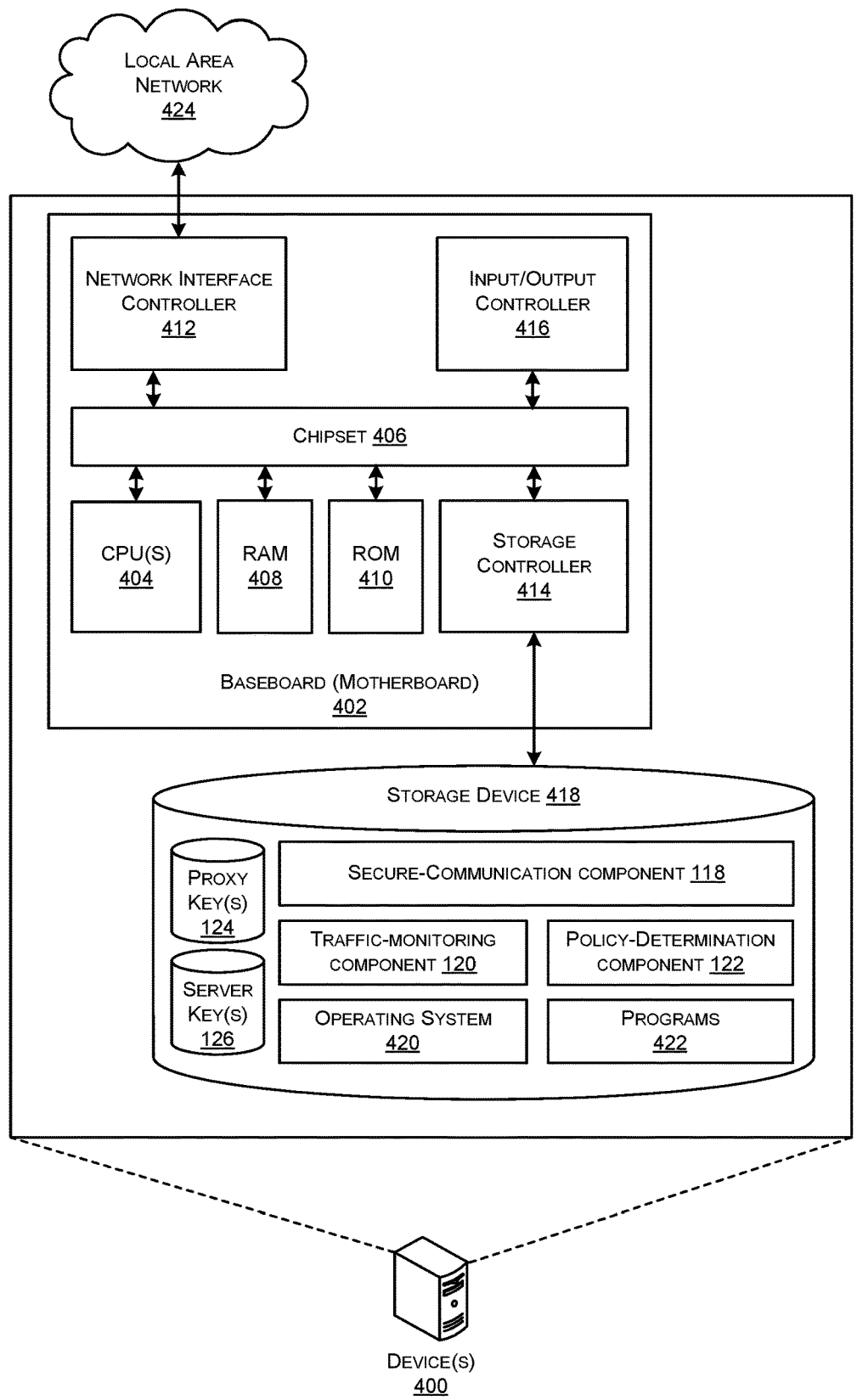
FIG. 4 is a computer architecture diagram showing an illustrative computer hardware architecture for implementing a device that can be utilized to implement aspects of the various technologies presented herein.

FIG. 4 is a computer architecture diagram showing an illustrative computer hardware architecture for implementing a device 400 that can be utilized to implement aspects of the various technologies presented herein, such as some or all of the operations performed by the network security devices, the client device, the domain name server, and/or the server device.

The device 400 includes a baseboard 402, or "motherboard," which is a printed circuit board to which a multitude of components or devices can be connected by way of a system bus or other electrical communication paths. In one illustrative configuration, one or more central processing units (CPUs) 404 operate in conjunction with a chipset 406. The CPUs 404 can be standard programmable processors that perform arithmetic and logical operations necessary for the operation of the device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the device 400. The chipset 406 can further provide an interface to a computer-readable storage medium such as a read-only memory (ROM) 410 or non-volatile RAM (NVRAM) for storing basic routines that help to startup the device 400 and to transfer information between the various components and devices. The ROM 410 or NVRAM can also store other software components necessary for the operation of the device 400 in accordance with the configurations described herein.

The device 400 can operate in a networked environment using logical connections to remote computing devices and computer systems through a network, such as a local area network 424. The chipset 406 can include functionality for providing network connectivity through a Network Interface Card (NIC) 412, such as a gigabit Ethernet adapter. The NIC 412 is capable of connecting the device 400 to other computing devices over the network. It should be appreciated that multiple NICs 412 can be present in the device 400, connecting the computer to other types of networks and remote computer systems.

The device 400 can be connected to a storage device 418 that provides non-volatile storage for the computer. The storage device 418 can store an operating system 420, programs 422, and data, which have been described in greater detail herein. The storage device 418 can be connected to the device 400 through a storage controller 414 connected to the chipset 406. The storage device 418 can consist of one or more physical storage units. The storage controller 414 can interface with the physical storage units through a serial attached SCSI (SAS) interface, a serial advanced technology attachment (SATA) interface, an FC interface, or other type of interface for physically connecting and transferring data between computers and physical storage units.

The device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 400 can further read information from the storage device 418 by detecting the physical states or characteristics of one or more particular locations within the physical storage units.

In addition to the mass storage device 418 described above, the device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 400.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the device 400. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 418 can store other system or application programs and data utilized by the device 400.

In one embodiment, the storage device 418 or other computer-readable storage media is encoded with computer-executable instructions which, when loaded into the device 400, transform the computer from a general-purpose computing system into a special-purpose computer capable of implementing the embodiments described herein. These computer-executable instructions transform the device 400 by specifying how the CPUs 404 transition between states, as described above. According to one embodiment, the device 400 has access to computer-readable storage media storing computer-executable instructions which, when executed by the device 400, perform the various scenarios and processes described above with regard to FIGS. 2AB and 3A-B. The device 400 can also include computer-readable storage media having instructions stored thereupon for performing any of the other computer-implemented operations described herein.

The device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the device 400 might not include all of the components shown in FIG. 4, can include other components that are not explicitly shown in FIG. 4, or might utilize an architecture completely different than that shown in FIG. 4.

The device 400 may also store, in the storage device 418, the secure-communication component 118, the traffic-monitoring component 120, the policy-determination component 122, and/or the datastores 124 and/or 126, as discussed above. Some or all of these components, alone or in combination, may be configured to perform some or all of the techniques described above with reference to FIGS. 1-3B.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A network security device configured to monitor data traffic between a first device and a second device, the network security device comprising:
one or more processors; and
one or more non-transitory computer-readable media storing computer-executable instructions that, when executed by the one or more processors, cause the one or more processors to perform acts comprising:
intercepting a first initial message of a first encrypted handshaking procedure for a first secure communication session between the first device and the second device, the first initial message specifying a hostname that has been encrypted using first key information associated with the network security device;
decrypting at least a portion of the first initial message using the first key information to determine the hostname;
sending, to a domain name server, a request for second key information associated with the second device;
re-encrypting, after the sending the request for the second key information, the hostname using the second key information; and
sending, to the second device, a second initial message of a second encrypted handshaking procedure for a second secure communication session between the network security device and the second device, the second initial message specifying the hostname re-encrypted using the second key information.

2. The network security device as recited in claim 1, the acts further comprising:
sending the first key information to the domain name server prior to the intercepting of the first initial message;
and wherein the domain name server provides the first key information to the first device at least partly in response to the first device sending a request for an address associated with the second device.

3. The network security device as recited in claim 1, wherein the second initial message further includes the second key information for encrypting the second encrypted handshaking procedure.

4. The network security device as recited in claim 1, the acts further comprising:
determining, based at least in part on the hostname, to refrain from monitoring the data traffic between the first device and the second device; and
sending, to the first device and at least partly in response to determining to refrain from monitoring the data traffic, a retry request specifying the second key information.

5. The network security device as recited in claim 4, the acts further comprising:
intercepting a third initial message of a third encrypted handshaking procedure for a third secure communication session between the first device and the second device, the third initial message specifying the hostname that has been encrypted using the second key information; and
determining, based on one or more criteria of the third initial message, whether to send the third initial message to the second device without decrypting the hostname.

6. The network security device as recited in claim 5, wherein the determining whether to send the third initial message to the second device comprises determining whether the third initial message was intercepted within a threshold amount of time after the sending of the retry request.

7. The network security device as recited in claim 5, wherein the determining whether to send the third initial message to the second device comprises determining whether the hostname specified in the third initial message was encrypted using the second key information.

8. The network security device as recited in claim 1, the acts further comprising receiving the second key information from the domain name server.

9. A method implemented by a network security device configured to monitor data traffic between a first device and a second device, the method comprising:
intercepting a first initial message of a first encrypted handshaking procedure for a first secure communication session between the first device and the second device, the first initial message specifying a hostname that has been encrypted using first key information associated with the network security device;

decrypting at least a portion of the first initial message using the first key information to determine the hostname;

sending, to a domain name server, a request for second key information associated with the second device;

re-encrypting, after the sending the request for the second key information, the hostname using the second key information; and sending, to the second device, a second initial message of a second encrypted handshaking procedure for a second secure communication session between the network security device and the second device, the second initial message specifying the hostname re-encrypted using the second key information.

10. The method as recited in claim 9, further comprising:
sending the first key information to the domain name server prior to the intercepting of the first initial message;

and wherein the domain name server provides the first key information to the first device at least partly in response to the first device sending a request for an address associated with the second device.

11. The method as recited in claim 9, wherein the second initial message further includes the second key information for encrypting the second encrypted handshaking procedure.

12. The method as recited in claim 9, further comprising:
determining, based at least in part on the hostname, to refrain from monitoring the data traffic between the first device and the second device; and sending, to the first device and at least partly in response to determining to refrain from monitoring the data traffic, a retry request specifying the second key information.

13. The method as recited in claim 12, further comprising:
intercepting a third initial message of a third encrypted handshaking procedure for a third secure communication session between the first device and the second device, the third initial message specifying the hostname that has been encrypted using the second key information; and determining, based on one or more criteria of the third initial message, whether to send the third initial message to the second device without decrypting the hostname.

14. The method as recited in claim 13, wherein the determining whether to send the third initial message to the second device comprises determining whether the third initial message was intercepted within a threshold amount of time after the sending of the retry request.

15. The method as recited in claim 13, wherein the determining whether to send the third initial message to the second device comprises determining whether the hostname specified in the third initial message was encrypted using the second key information.

16. The method as recited in claim 9, further comprising receiving the second key information from the domain name server.

17. A method implemented by a network security device configured to monitor data traffic between a first device and a second device, the method comprising:
intercepting a first message sent from the first device and addressed to the second device, the first message specifying a hostname that has been encrypted using first key information associated with the network security device;

decrypting at least a portion of the first message to determine the hostname;

sending, to a domain name server, a request for second key information associated with the second device;

encrypting, after the sending the request for the second key information, the hostname using the second key information;

sending, to the second device, a second message including the hostname encrypted using the second key information.

18. The method as recited in claim 17, further comprising:
sending the first key information to the domain name server prior to the intercepting of the first initial message;

and wherein the domain name server provides the first key information to the first device at least partly in response to the first device sending a request for an address associated with the second device.

19. The method as recited in claim 17, further comprising:
determining, based at least in part on the hostname, to refrain from monitoring the data traffic between the first device and the second device;

sending, to the first device and at least partly in response to determining to refrain from monitoring the data traffic, a retry request specifying the second key information;

intercepting a third message send from the first device and addressed to the second device, the third message specifying the hostname that has been encrypted using the second key information;

determining that the third message was intercepted within a threshold amount of time after the sending of the retry request;

determining that the hostname specified in the third message was encrypted using the second key information; and sending the third message to the second device without decrypting the hostname based at least in part on the determining that the third message was intercepted within the threshold amount of time and the determining that the hostname specified in the third message was encrypted using the second key information.

20. The method as recited in claim 17, further comprising receiving the second key information from the domain name server.

* * * * *